Figure 4:
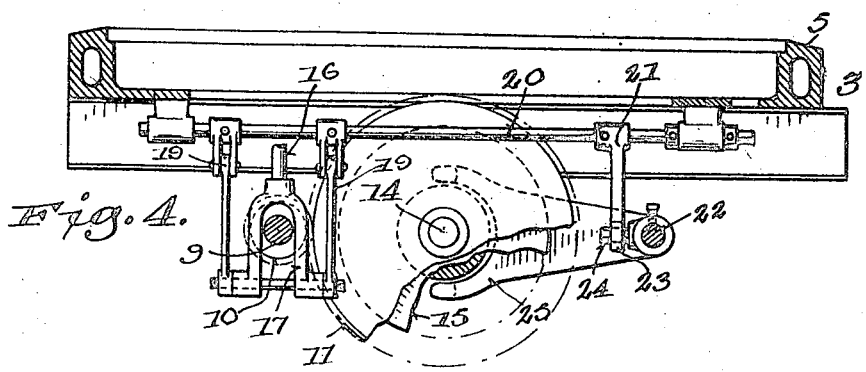

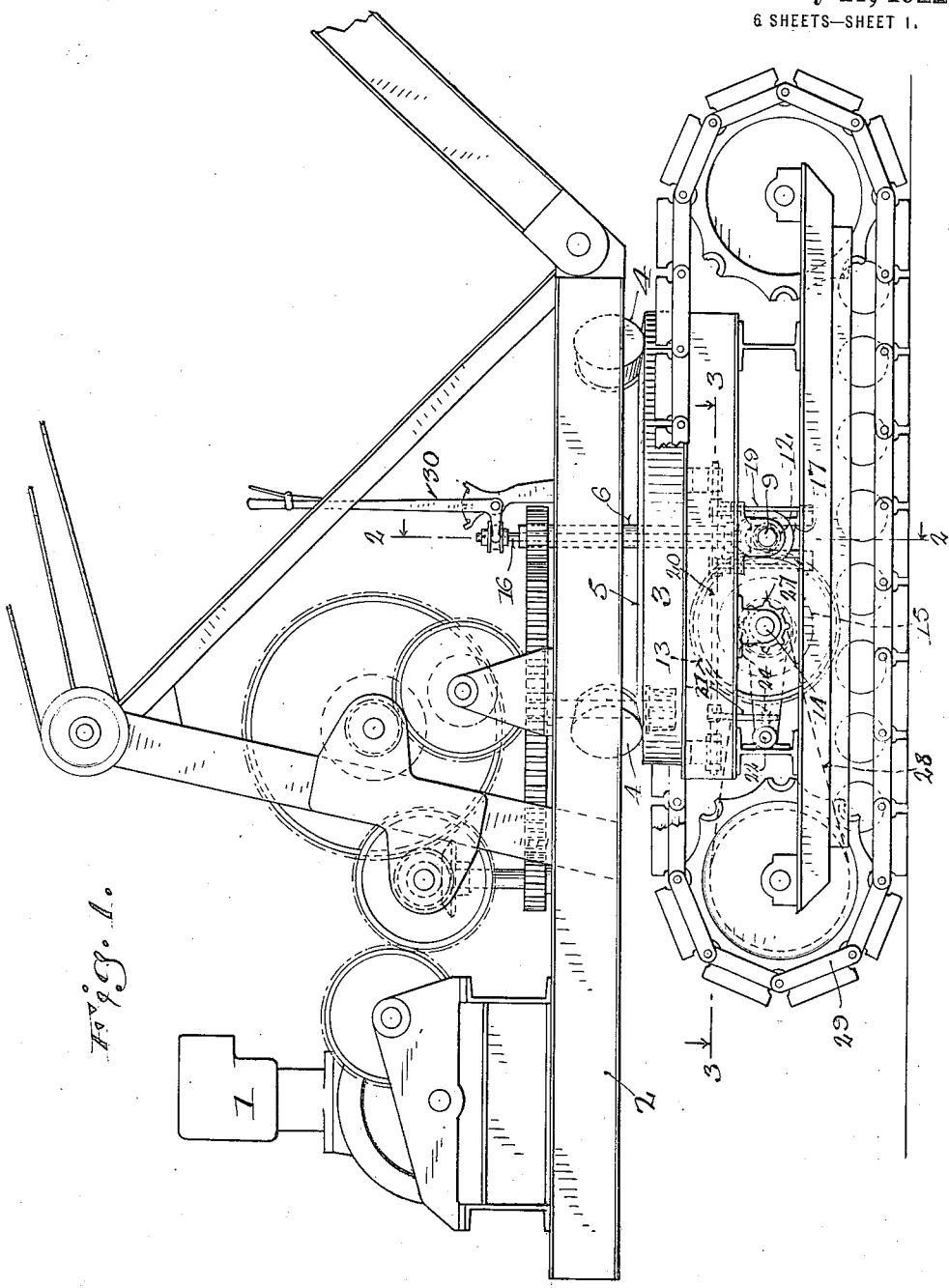

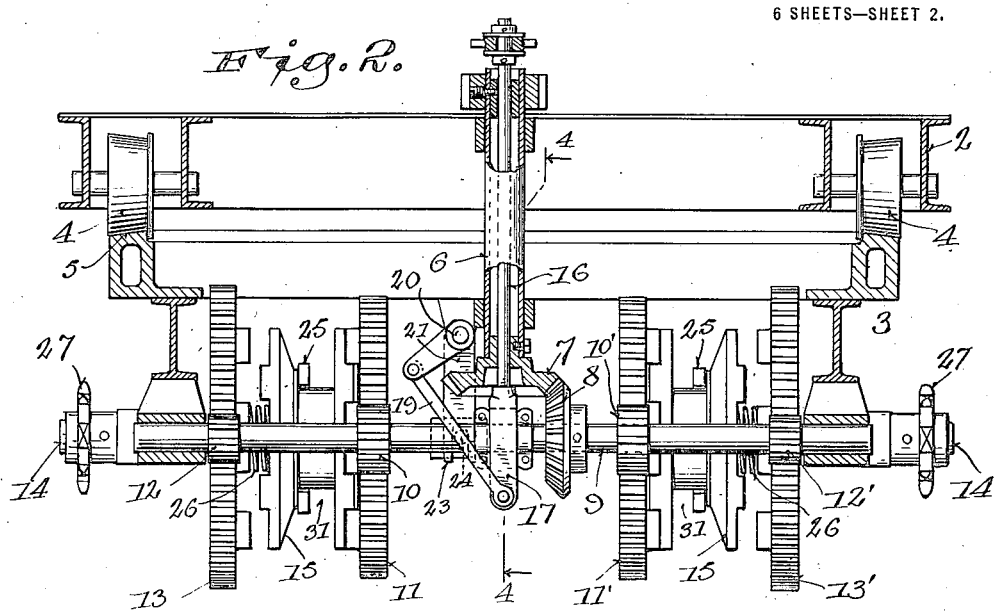
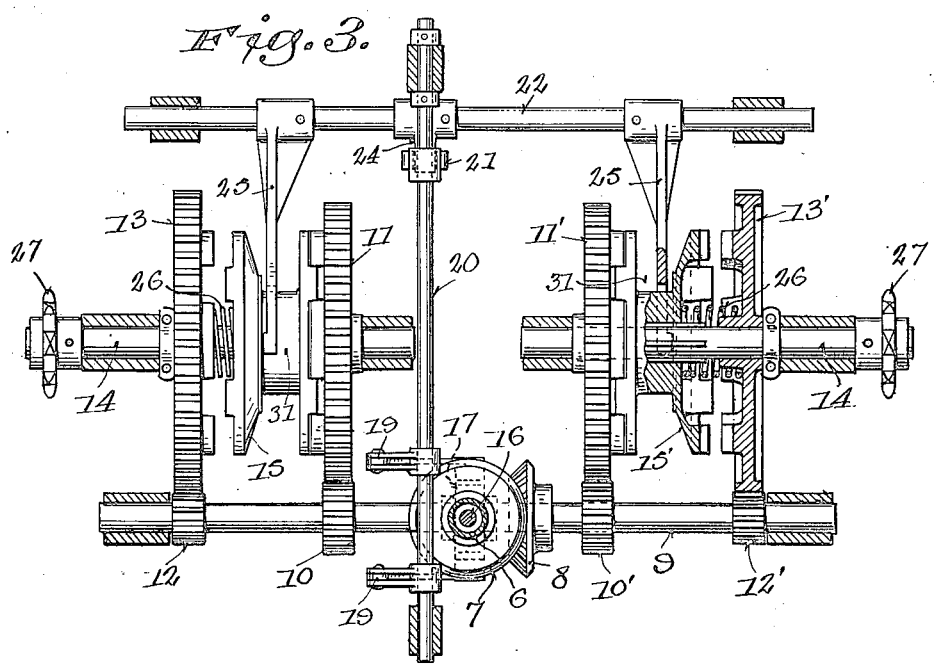

P. BURKE.
CONTROL MEANS FOR LOCOMOTIVE CRANES.
APPLICATION FILED OCT. 2, 1920.
1,422,082.
Patented July 11, 1922.
8 SHEETS—SHEET 4.
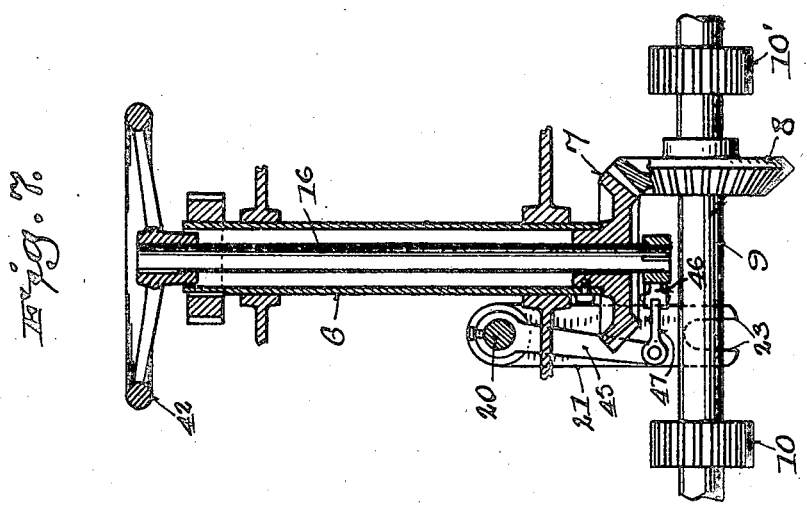
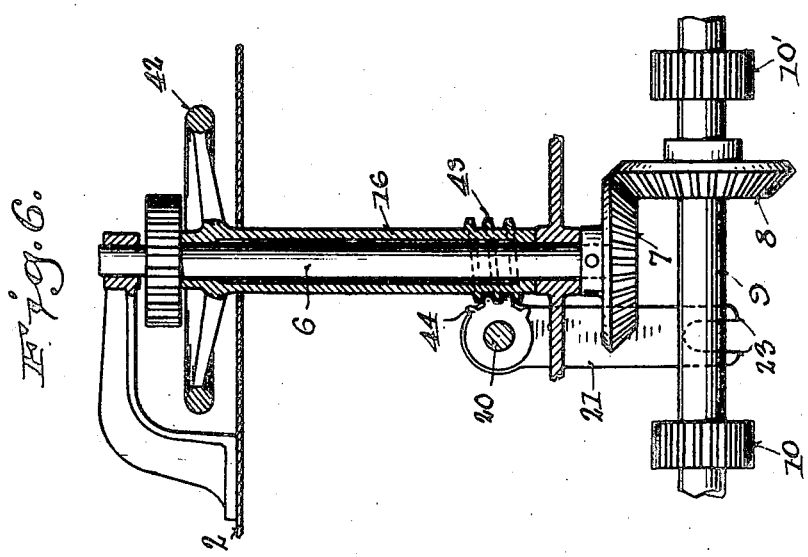
INVENTOR.
Paul Burke
BY
Louis Quarles
ATTORNEY.

P. BURKE.
CONTROL MEANS FOR LOCOMOTIVE CRANES.
APPLICATION FILED OCT. 2, 1920.

1,422,082.

Patented July 11, 1922.
6 SHEETS—SHEET 5.

INVENTOR.
Paul Burke
BY
Louis Quarles
ATTORNEY.

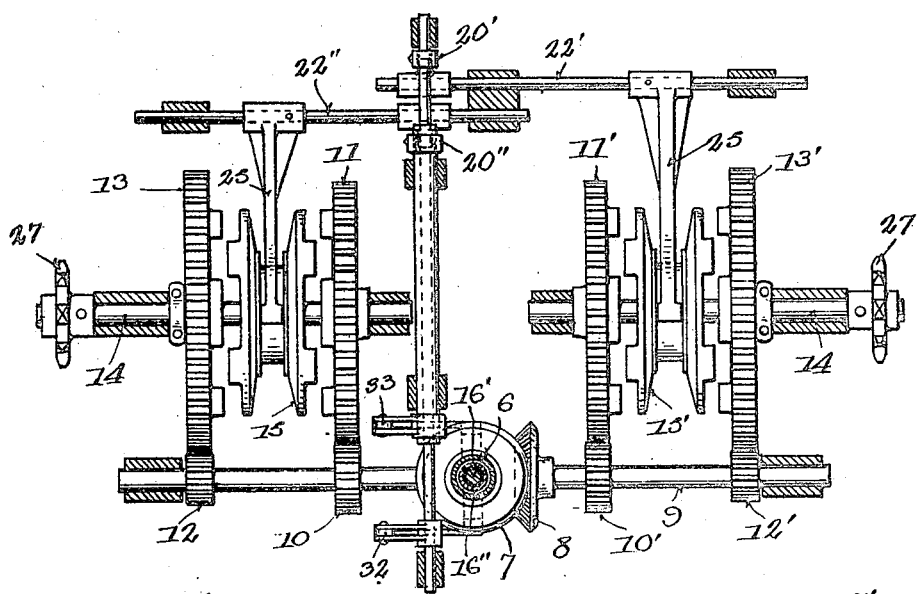
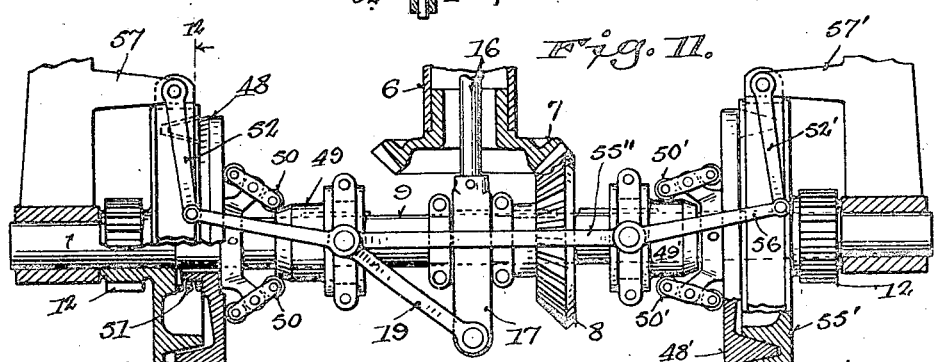
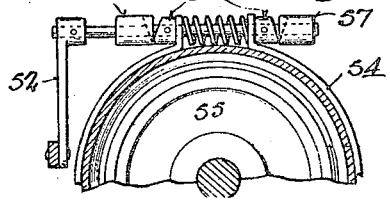

UNITED STATES PATENT OFFICE.

PAUL BURKE, OF GREEN BAY, WISCONSIN, ASSIGNOR, BY MESNE ASSIGNMENTS, TO NORTHWEST ENGINEERING COMPANY, A CORPORATION OF WISCONSIN.

CONTROL MEANS FOR LOCOMOTIVE CRANES.

1,422,082.  Specification of Letters Patent.  Patented July 11, 1922.

Application filed October 2, 1920. Serial No. 414,217.

*To all whom it may concern:*

Be it known that I, PAUL BURKE, a citizen of the United States of America, and a resident of Green Bay, Brown County, Wisconsin, have invented a certain new and useful Control Means for Locomotive Cranes, of which the following is a specification.

My invention relates particularly to self-propelling units of the type commonly used for locomotive cranes, steam shovels, dragline excavators and the like, in which the hoisting, excavating or other apparatus is mounted on a platform or base, generally called a rotating base on which the operator stands, which is in turn so mounted upon a fixed base, generally called the traveling base, that the rotating base revolves thereon in a horizontal plane. The traveling base is equipped with endless propelling treads or other traction elements and operatively geared to the boiler and engine or other prime mover mounted on the rotating base so that the machine is self-propelled.

Where the device uses endless propelling treads it is highly desirable to steer without trailing wheels, outriggers or other devices and often it is desired to vary the speed and power of the machine as a whole by the interposition of gearing. In devices of this kind as at present used, so far as I am aware, no method has been devised for controlling the speed by the interposition of gears of varying ratio or of steering the device by means of varying the operative speed of the two endless treads when the machine is traveling, without interfering with the rotation of the traveling base or locking the rotating base in a certain predetermined fixed position with regard to the traveling base. Sometimes steering is accomplished by having an extra operator follow the machine on foot and operate the steering gear from the ground. All such devices are clumsy in the extreme and do not permit of the machine's moving freely forward while in the operation of digging, etc. When in operation it is often advisable and sometimes necessary that the machine move forward under its own power when the rotating base is not in exact and fixed alignment with the traveling base, and my invention is designed to provide a device which can be moved forward or backward under its own power when the rotating base is in any position. It is also so designed that the machine can move forward or backward under its own power and the base be rotated at one and the same time. My invention is further designed to permit of the change of speed or power so that slower speed may be interposed if desirable to enable the tractor to pull out of very heavy mud or over extreme grades and do so while the rotating platform is in any position.

My invention is further designed and has as one of its objects the use of a simple power arrangement which will permit of using one single prime mover, such as a steam engine for hoisting or excavating purposes, as the case may be, for rotating the rotating base, and for propulsion of the entire mechanism. For many purposes it is highly desirable that the number of prime movers be reduced to a minimum and my invention permits the accomplishment of all three functions, i. e., operating the device, rotating the rotating base, and longitudinal locomotion of the traveling base by one and the same engine. My invention requires only strictly positively operated mechanical means for transmitting power from the engine to the tractor elements.

My invention is also designed to afford a positive speed ratio between the propelling treads so that the relative rate of propulsion thereof may be definitely controlled irrespective of the differing nature of the ground or obstacles upon which the different treads bear. Under some circumstances it is advisable to have both sides of the crawler afford positive traction while operating at different speeds, and this result is secured by my invention.

Figure 5:
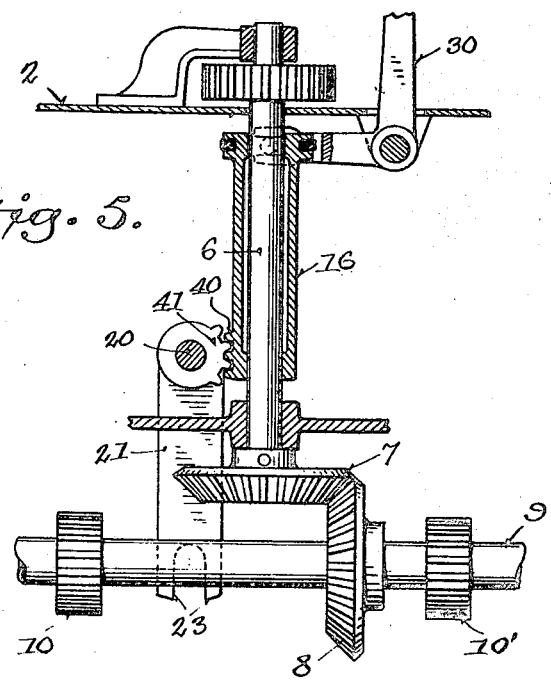
Figure 8:
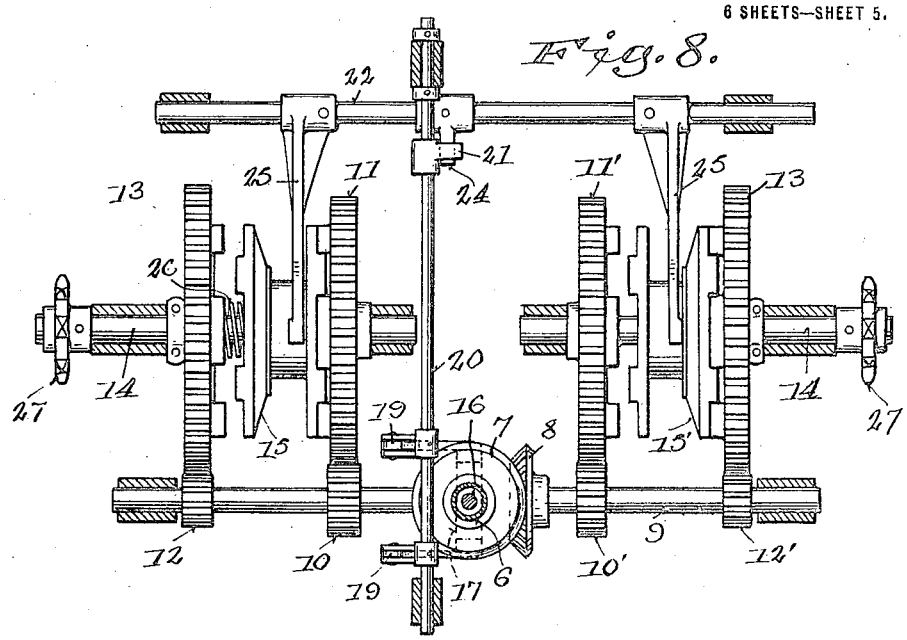
Figure 9:
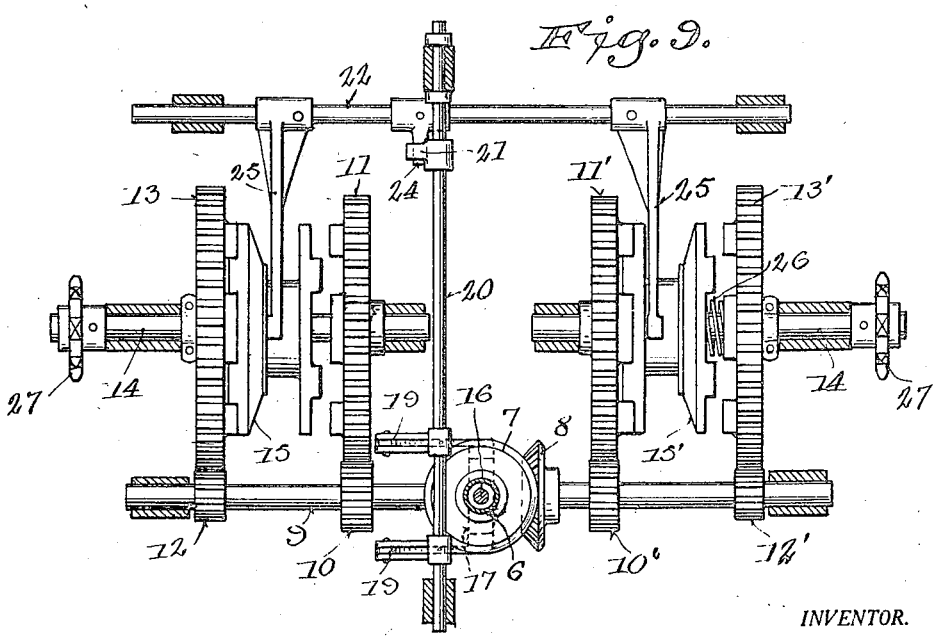

To this and other useful ends my invention consists in a method of control mechanism and combination of parts hereinafter set forth and claimed. In the accompanying drawings Fig. 1 is a semi-diagrammatic side elevation of a locomotive crane embodying the principles of my invention. Fig. 2 is a diagrammatic sectional view along the lines 2—2 in Fig. 1 looking in the direction of the arrows. Fig. 3 is a plan view of the control mechanism taken along the lines 3—3 of Fig. 1 looking in the direction of the arrows. Fig. 4 is a detail section taken along the line 4—4 of Fig. 2 looking in the direction of the arrows. Fig. 5 is a modification showing the control connection between the rotating and traveling bases external to the vertical travel shaft. Figs. 6 and 7 show further modifications in which the control mechanism is operated by manual rotation rather than by lifting and depressing in a vertical plane. Figs. 8 and 9 show the clutches, etc. of Fig. 3 in different operative positions, and Figs. 10 and 11 show modifications. Fig. 12 shows a section along the lines 12—12 in Fig. 11. In the figures like numerals denote like parts throughout.

As illustrated, the locomotive crane consists essentially of an engine 1 for operating the crane and for causing the propulsion, operated by suitable boiler or other motive power not shown all mounted on a rotating base 2 which rotates upon a traveling base 3 by means of rollers 4 that run upon a circular track 5, the whole rotating around the center indicated at the lines 2—2 of Fig. 1, and also indicated by the lines 4—4 of Fig. 2. The engine 1 transmits the power to the traveling base 3 through a shaft 6 which is either solid or hollow and concentric with the rotating center indicated by the line 2—2 aforesaid. This shaft 6 has affixed to the lower end thereof the pinion 7 which meshes with bevel gear 8 which is rigidly affixed to the shaft 9. This shaft 9 carries a plurality of pinions, preferably four, two of which 10—10' mesh with gears 11—11'; the other two of which, 12—12' mesh with gears 13—13'. The gears and pinions 10, 11, 12, and 13 are respectively like the gears and pinions 10', 11', 12', and 13'. These sets of pinions and gears are of different gear ratios so that the combination of the pinion 10 and gear 11 transmits a different rate of speed and power than the combination of the pinion 12 and the gear 13. The gears 11 and 11' and 13 and 13' are loosely mounted upon jack shafts 14 so that they may rotate freely thereon. Between the gears 11 and 11' and 13 and 13' are jaw clutches 15 and 15' which engage with corresponding teeth on either of the gears 11 and 11' or 13 and 13'. If preferred friction or other equivalent clutches may be used in place of jaw clutches. The clutches 15 and 15' are movable laterally on the jack shafts 14 but are mounted either by means of splines, keys, square shafts or similar means, so that they cannot be rotated independent of the jack shafts.

When acting as a self-propelled vehicle, the speed, power and direction control of the device are effected by controlling the positions of the clutches 15 and 15'. These are operated by the following mechanism: The control shaft 16 is mounted either within the shaft 6 or surrounding it (see Figs. 2 and 5 respectively) and concentric with the center of rotation 2—2 of Fig. 1. This shaft 16 is preferably provided with a yoke or fork 17 to straddle the shaft 9 and is connected by link motion 19 with the rocker shaft 20. This rocker shaft has an arm 21 which operates the slide longitudinally the shifter bar 22 by means of the fingers 23 straddling the pin 24. The shifter bar 22 is provided with two shifting yokes 25 which straddle the clutches 15 and 15'. The clutches 15 and 15' are made with a sufficient dwell so that the shifting yokes 25 may be moved from the position shown in Fig. 3 to the position shown in Figs. 8 and 9 without disturbing the other clutch. The clutches 15 and 15' are normally kept in engagement with the gears 11 and 11' by coil springs 26.

Referring to Figs. 1, 2, and 3, in operation power is transmitted through the shaft 6, the bevel gears 7 and 8, the pinion shaft 9, the pinions 10 and 10', the gears 11 and 11', the jack shafts 14 and 14', the sprockets 27, and through chains 28 to one of each set of sprockets on which the endless propelling treads 29 run. If it is desired to steer the machine the shaft 16 is depressed by means of a hand lever 30. This pulls down the link 19 and rotates the rocker shaft 20 and pushes the shifter bar 22 to the right, thus disengaging the clutch 15' from the gear 11' causing it to engage with the gear 13' and thus the left hand endless tread is operated at a slower speed than the right hand, causing the machine to turn to the left. During this operation the shifting yoke 25 does not operate on the clutch 15 but moves over in the dwell 31. The whole mechanism then occupies the position shown in Fig. 8.

If it is desired to steer the machine in the opposite direction the shaft 16 is raised and the mechanism is caused to assume the position shown in Fig. 9.

If it is desired to shift from the higher set of gears as shown in Fig. 3 to the lower set of gears it is necessary to make the shifter bar in two pieces 22' and 22" as is shown in Fig. 10, each of which is independently operated by concentric shafts 16' and 16" through link motion 32 and 33 and through the rocker arms 20' and 20" and intervening mechanism as heretofore set forth. By means of this device the raising of both shafts simultaneously will cause the clutches 15 and 15' to disengage the gears 11 and 11' and engage the gears 13 and 13', thus changing the speed and power of the machine. Steering is done by raising one of the shafts 16' or 16" only, leaving the other in its normal position, or if desired, they may be raised to an intermediate position thus placing the clutches 15 or 15' in neutral position. In the construction as shown in Fig. 10 no dwell is provided in clutches 15 and 15' as they are independently and positively operated.

A further modification is shown in Fig. 5 wherein the shaft 16 is external to the vertical driving shaft 6 and communicates the motion to the rocking shaft 20 by means of a rack 40 and pinion 41.

A further modification is shown in Fig. 6 wherein the steering is affected by means of a hand wheel 42 such as is used on automobiles, mounted on the shaft 16 and rotating the rocker arm 21 by means of the worm 43, meshing with the gear 44 on the rocker arm 20. Fig. 7 is a further modification in which the hand wheel 42 is mounted on the shaft 16 that is mounted within the power shaft 6, the transmission of motion being effected by the rocker arm 45 through the lever 46 and link 47.

In view of the fact that the rotating base 2 rotates freely upon the fixed base 3 there is only one point in common between them and that is the center of rotation 2—2 in Fig. 1. It is therefore imperative that the means of direction and speed control be mounted concentric with this center so as to be unaffected by the motion of the rotating base relative to the traveling base.

A further modification is shown in Fig. 11 wherein the direction control is attained by means of single friction clutches and band brakes. In this figure the shaft 16 is normally in what might be called neutral position in which both clutches 48 and 48' are in engagement. When it is desired to steer the machine the shaft 16 is depressed as shown in Fig. 11, which depresses the yoke or fork 17, the link motion 19, retracting the collar 49, permitting the roller 50 to run down on the inclined edge of the collar 49, and thus permitting the spring 51 to throw the clutch 48 out of engagement. A further depressing of the shaft 16 operates to pull on the brake lever 52 sufficiently so that it rotates the cams 53 in Fig. 12, thus tightening the bands 54 which surround the combined brake drum and clutch socket 55. As a result of the releasing of the clutch and the application of the brake the machine turns to the right. In order to steer the machine to the left exactly the same operation is gone through excepting that the shaft 16 is raised. This pulls on the links 55" and 56 and operates the rollers 50' and releases the clutch 48' in the same way as clutch 48 is released when the shaft 16 is depressed. A further raising of the shaft 16 still further operates the lever 52' and applies the brake band 54' upon the combined clutch socket and brake band 55'. The brake bands 54 and 54' are hung in brackets 57 and 57'. The cams 53 are preferably so set that the brake band 54 does not come into contact with the brake drum 55 until after the clutches 48 or 48', as the case may be, are released from the clutch socket 55, as this gives the operator better control of the steering. If the conditions are right the machine may turn by merely releasing the clutch although there is a tendency of the tractor element to follow along with the element that is operated under power, and for this reason the brakes have been added. The radius of curvature is determined primarily by the tension put on the brake band. It can even be locked if a very sharp turn is desired.

I have shown the mechanism in Fig. 11 as mounted on the pinion shaft 9 rather than on the driven shaft 14, although it may be mounted on either.

I do not desire to limit myself to the particular class of vehicles described, as my invention is adaptable to any type of machine in which the base upon which the operator stands is rotatable with respect to the propulsion wheels. Neither is my device limited to use with endless propelling treads as round wheel machines can be similarly operated, nor do I want to be understood as limiting myself to the specific mechanism or combinations or arrangement of parts as here shown as many modifications can be made and as I reserve the right to make modifications and changes within the scope of the appended claims.

Having fully described my invention, I claim:

1. The combination, with traction elements and a base wholly supported thereby, of a rotating base mounted on said base, a prime mover on said rotating base, a power transmission shaft located in the axis of rotation of said rotating base and driven by said prime mover, transmission mechanism between said shaft and traction elements to positively drive said elements at the same or differential speeds whereby said machine may be positively driven and turned entirely under its own force, and control means for said driving means coaxial with the axis of rotation of said rotating base and operable therefrom irrespective of its position or movement.

2. The combination, with a pair of spaced endless propelling treads and a base wholly supported thereby, of a rotating base mounted on said base, a prime mover on said rotating base, a power transmission shaft located in the axis of rotation of said rotating base and driven by said prime mover, selective transmission mechanisms connecting said shaft with said treads to positively drive both treads at the same or different speeds whereby said machine may be positively driven and turned entirely under its own force, and control means for said transmission mechanism coaxial with said shaft and operable from said rotating base irrespective of its position or movement.

3. The combination with a pair of spaced endless propelling treads and a base wholly supported thereby, of a rotating base mounted on said base, a prime mover on said rotating base, a power transmission shaft located in the axis of rotation of said rotating base and driven by said prime mover, change speed gearing connections between said shaft and each of said treads whereby to positively drive said treads at the same speed or differential speeds, clutches for selectively establishing said gearing connection and clutch shifting mechanism, including a control coaxial with said shaft and operable from the rotating base irrespective of its position or movement.

4. The combination, with traction elements and a base wholly supported thereby, of a rotating base mounted on said base, a prime mover on said rotating base, a power transmission shaft located in the axis of rotation of said rotating base and driven by said prime mover, transmission mechanism between said shaft and traction elements to positively drive said elements at a speed ratio relative to each other of unity or other predetermined fixed ratio other than unity and greater than zero, whereby said machine may be positively driven and turned entirely by the predetermined speed ratio of the two traction elements, and single control means for said driving means coaxial with the axis of rotation of said rotating base and operable therefrom irrespective of its position or movement.

5. The combination, with a pair of spaced endless propelling treads and a base wholly supported thereby, of a rotating base mounted on said base, a prime mover on said rotating base, a power transmission shaft located in the axis of rotation of said rotating base and driven by said prime mover, selective transmission mechanisms connecting said shaft with said treads to positively drive both treads at a speed ratio relative to each other of unity or other predetermined fixed ratio other than unity and greater than zero, whereby said machine may be positively driven and turned entirely by the predetermined speed ratio of the two traction elements, and single control means for said transmission mechanism coaxial with said shaft and operable from said rotating base irrespective of its position or movement.

6. The combination with a pair of spaced endless propelling treads and a base wholly supported thereby, of a rotating base mounted on said base, a prime mover on said rotating base, a power transmission shaft located in the axis of rotation of said rotating base and driven by said prime mover, change speed gearing connections between said shaft and each of said treads whereby to positively drive said treads at a speed ratio relative to each other of unity or other predetermined fixed ratio other than unity and greater than zero, clutches for selectively establishing said gearing connection, clutch shifting mechanism, and a single control for said clutch shifting mechanism coaxial with said shaft and operable from the rotating base irrespective of its position or movement.

7. The combination with a pair of spaced endless propelling treads and a base wholly supported thereby, of a rotating base mounted on said base, a prime mover on said rotating base, a power transmission shaft located in the axis of rotation of said rotating base and driven by said prime mover, change speed gearing connections between said shaft and each of said treads whereby to positively drive said treads at a speed ratio relative to each other of unity or other predetermined fixed ratio other than unity and greater than zero, double faced clutches adapted to engage the different speed ratios alternately, springs for holding said clutches in normal engagement with the same gear ratios on both traction elements, and a single control means for severally shifting one of said clutches out of its normal engagement and into engagement with the other speed gear for one of the traction elements while allowing the clutch on the other traction element to remain in normal engagement, said control mechanism being coaxial with said shaft and operable from the rotating base, irrespective of the position or movement of the operating base, and a single control for said control mechanism.

8. The combination with a pair of spaced endless propelling treads and a base wholly supported thereby, of a rotating base mounted on said base, a prime mover on said rotating base, a power transmission shaft located in the axis of rotation of said rotating base and driven by said prime mover, change speed gearing connections between said shaft and each of said treads whereby to positively drive said treads at a speed ratio relative to each other of unity or other predetermined fixed ratio other than unity and greater than zero, double faced clutches adapted to engage the different speed ratios alternately, springs for holding said clutches in normal engagement with the same gear ratios on both traction elements, a dwell on said clutches, a yoke fitting in said dwell and adapted to transmit longitudinal movement to the clutches, a shifter bar carrying both of said yokes, said yokes being so arranged that they are substantially in contact with the spring actuated side of the clutches, control means for shifting said shifter bar longitudinally and thereby causing one of said yokes to throw one of the clutches out of its normal engagement and into the turning engagement while the other clutch is unaffected by reason of the other yoke's traveling in the dwell, said control means being single and coaxial with the axis of said rotating base and operable therefrom by a single control irrespective of the position or movement of the rotating base.

PAUL BURKE.